United States Patent
Turtinen et al.

(10) Patent No.: US 9,380,442 B2
(45) Date of Patent: Jun. 28, 2016

(54) DEVICE-TO-DEVICE DISCOVERY RESOURCE ALLOCATION

(75) Inventors: Samuli Turtinen, Ii (FI); Jussi K. Ojala, Helsinki (FI); Sami-Jukka Hakola, Kempele (FI); Timo K. Koskela, Oulu (FI); Jari Isokangas, Tampere (FI)

(73) Assignee: BROADCOM CORPORATION, Irvine, CA (US)

( * ) Notice: Subject to any disclaimer, the term of this patent is extended or adjusted under 35 U.S.C. 154(b) by 803 days.

(21) Appl. No.: 13/363,644

(22) Filed: Feb. 1, 2012

(65) Prior Publication Data

US 2013/0188546 A1 Jul. 25, 2013

(30) Foreign Application Priority Data

Jan. 20, 2012 (GB) .................................. 1201007.0

(51) Int. Cl.
*H04W 8/00* (2009.01)
*H04W 72/00* (2009.01)

(52) U.S. Cl.
CPC ............ *H04W 8/005* (2013.01); *H04W 72/005* (2013.01)

(58) Field of Classification Search
None
See application file for complete search history.

(56) References Cited

U.S. PATENT DOCUMENTS

| 2007/0195731 | A1* | 8/2007 | Camp, Jr. ....................... 370/329 |
| 2008/0186895 | A1* | 8/2008 | Shang et al. .................. 370/312 |
| 2009/0017807 | A1* | 1/2009 | Kwon et al. ................... 455/416 |
| 2009/0196247 | A1* | 8/2009 | Fan et al. ...................... 370/329 |
| 2010/0011110 | A1* | 1/2010 | Doppler et al. ............... 709/228 |
| 2010/0165882 | A1* | 7/2010 | Palanki et al. ................. 370/254 |
| 2010/0240312 | A1* | 9/2010 | Peng et al. ..................... 455/63.1 |
| 2011/0021224 | A1* | 1/2011 | Koskinen et al. ............. 455/507 |
| 2011/0098043 | A1* | 4/2011 | Yu et al. ...................... 455/435.1 |
| 2011/0216842 | A1* | 9/2011 | Zhang ................... H04L 5/0051 375/260 |
| 2011/0244899 | A1* | 10/2011 | Li et al. ......................... 455/501 |
| 2011/0258327 | A1* | 10/2011 | Phan et al. ..................... 709/227 |
| 2011/0268004 | A1* | 11/2011 | Doppler et al. ............... 370/311 |

(Continued)

FOREIGN PATENT DOCUMENTS

| CN | 101998241 A | 3/2011 |
| WO | WO-2011116815 A1 | 9/2011 |

OTHER PUBLICATIONS

"Study on LTE Device-To-Device Discovery and Communication—Service and System Aspects", 3GPP TSG-RAN #52, RP-110708, May-Jun. 2011, 5 pgs.

(Continued)

*Primary Examiner* — Hassan Phillips
*Assistant Examiner* — Gautam Sharma
(74) *Attorney, Agent, or Firm* — Oblon, McClelland, Maier & Neustadt, L.L.P.

(57) ABSTRACT

The specification and drawings present a new method, apparatus and software related product (e.g., a computer readable memory) for implementing a D2D discovery resource allocation by a network for D2D discovery by UEs belonging to multiple cells in a D2D discovery area, e.g., in LTE wireless systems. A network such as LTE may determine an allocation of one or more resources (UL and/or DL) for a device-to-device discovery among a plurality of UEs located in multiple cells of the network in a D2D discovery area. The allocation of the one or more resources is then may be provided by the network to the plurality of UEs for performing, using these one or more resources, the D2D discovery between any two UEs of the plurality of UEs located in the multiple cells in the D2D discovery area.

20 Claims, 4 Drawing Sheets

(56) References Cited

U.S. PATENT DOCUMENTS

| | | | |
|---|---|---|---|
| 2011/0268006 A1* | 11/2011 | Koskela et al. | 370/312 |
| 2011/0282989 A1* | 11/2011 | Geirhofer et al. | 709/224 |
| 2012/0059935 A1* | 3/2012 | Patil et al. | 709/226 |
| 2012/0066396 A1* | 3/2012 | Kang et al. | 709/226 |
| 2012/0076028 A1* | 3/2012 | Ko et al. | 370/252 |
| 2012/0134329 A1* | 5/2012 | Lim et al. | 370/329 |
| 2012/0163235 A1* | 6/2012 | Ho et al. | 370/254 |
| 2013/0059583 A1* | 3/2013 | Van Phan et al. | 455/435.1 |
| 2013/0157656 A1* | 6/2013 | Gao et al. | 455/434 |

OTHER PUBLICATIONS

"Study on LTE Device to Device Discovery and Communication—Radio Aspects", 3GPP TSG-RAN #52, RP-110707, May-Jun. 2011, 5 pgs.

"On the need for a 3GPP study on LTE device-to-device discovery and communication", 3GPP TSG-RAN #52, RP-110706, May-Jun. 2011, 2 pgs.

"$3^{rd}$ Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10)", 3GPP TS 36.300 V10.4.0, Jun. 2011, 194 pgs.

"$3^{rd}$ Generation Partnership Project; Technical Specification Group Radio Access Network; Evolved Universal Terrestrial Radio Access (E-UTRA); Radio Resource Control (RRC); Protocol specification (Release 10)", 3GPP TS 36.331 V10.3.0, Sep. 2011, 296 pgs.

EP Search Report for corresponding GB Patent Application No. GB 1201007.0 mailed May 30, 2012.

\* cited by examiner

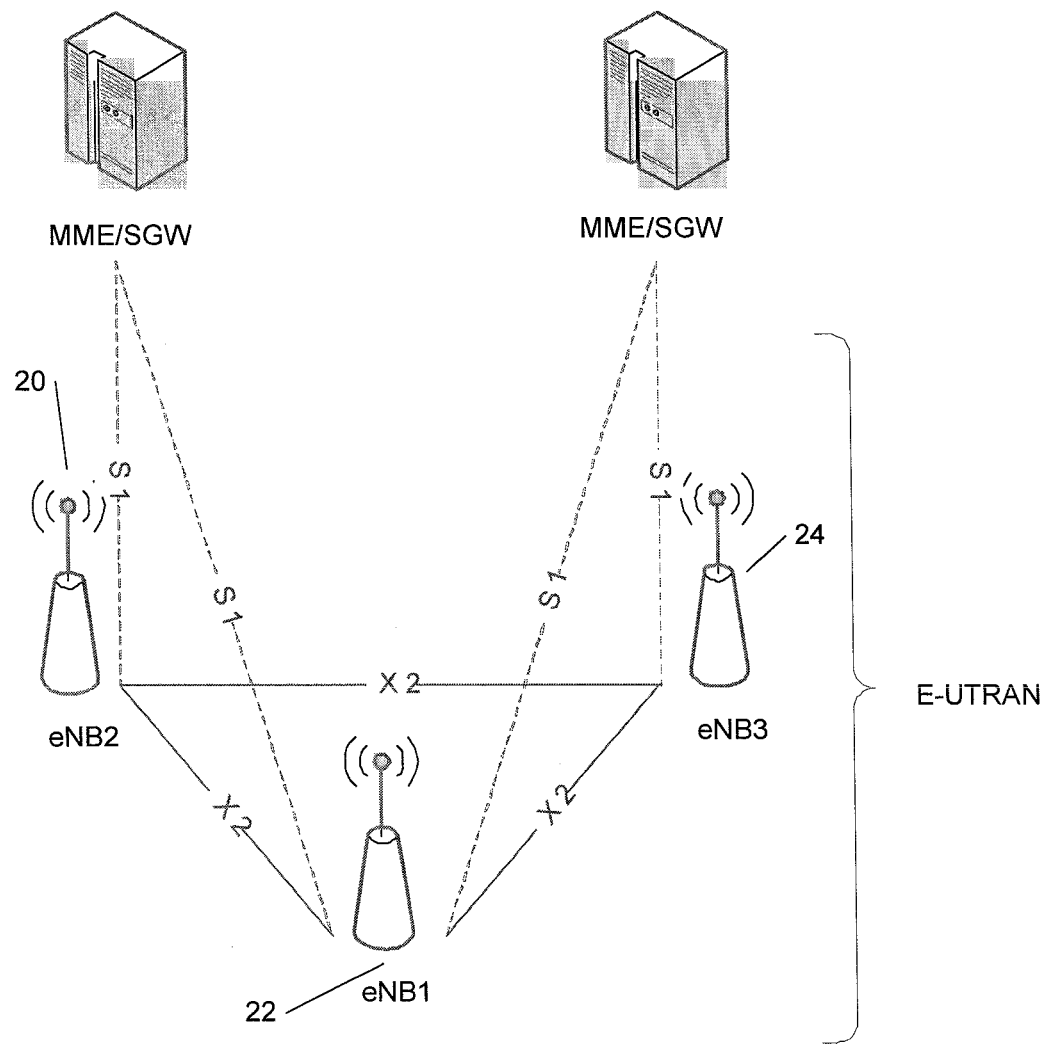
Figure 1: Prior Art

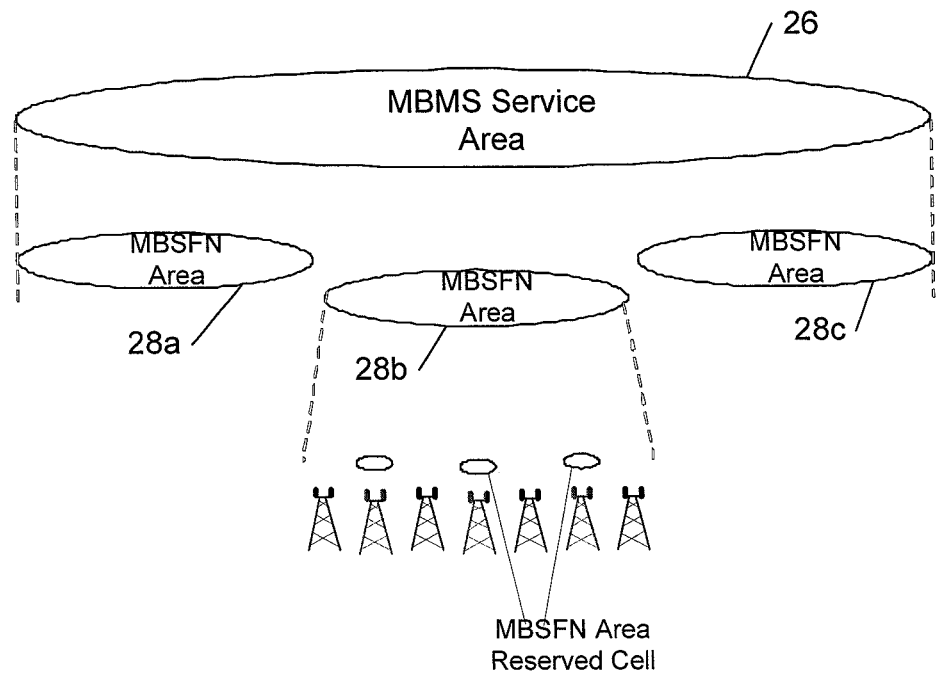
Figure 2: Prior Art
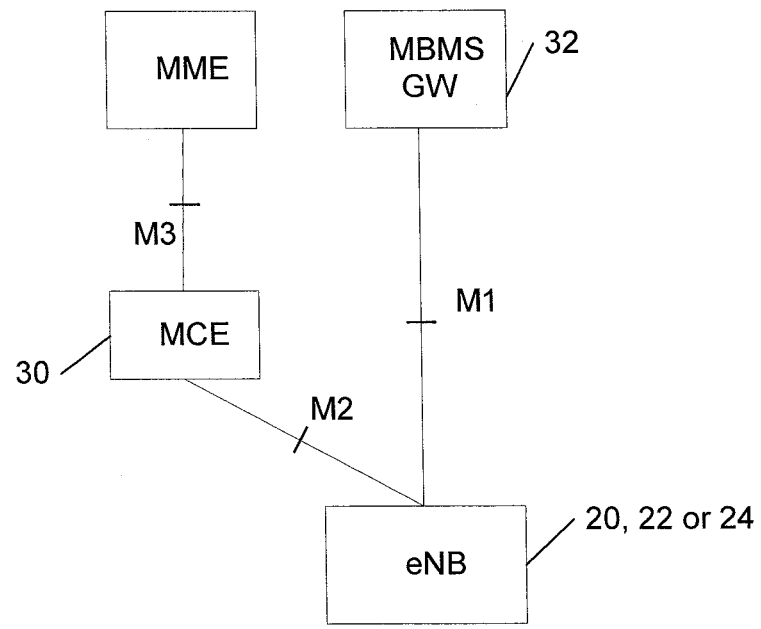
Figure 3: Prior Art

DEVICE-TO-DEVICE DISCOVERY RESOURCE ALLOCATION

TECHNICAL FIELD

The exemplary and non-limiting embodiments of this invention relate generally to wireless communications and more specifically to implementing a D2D discovery resource allocation by a network for D2D discovery by devices belonging to multiple cells in D2D discovery area.

BACKGROUND ART

The following abbreviations that may be found in the specification and/or the drawing figures are defined as follows:

- 3GPP third generation partnership project
- BCCH broadcast control channel
- BMSC broadcast-multicast service center
- CDM code division multiplexing
- CSI channel state information
- D2D device-to-device
- DCI downlink control information
- DL downlink
- CP cyclic prefix
- EDGE enhanced data rates for GSM evolution
- E-UTRA evolved universal terrestrial radio access
- eNB, eNodeB evolved node B/base station in an E-UTRAN system
- E-MBMS evolved multimedia broadcast multicast service
- EPC evolved packet core
- E-UTRAN evolved UTRAN (LTE)
- FDM frequency division multiplexing
- GERAN GSM EDGE radio access network
- GSM global system for mobile communications
- HARQ hybrid automatic repeat request
- ID identification
- LCID locale identifier
- LTE long term evolution
- LTE-A long term evolution advanced
- MAC medium access control
- M2M machine-to-machine
- MBMS multimedia broadcast multicast service
- MBSFN multimedia broadcast multicast service single frequency network
- MCCH multicast control channel
- MCE multi-cell/multicast coordination entity
- MCH multicast channel
- MCS modulation and coding scheme
- MIB master information block
- MIMO multiple input multiple output
- MME mobility management entity
- M-RNTI MBMS radio network temporary identifier
- MSI MCH Scheduling Information
- MSP MCH scheduling period
- MTCH multicast traffic channel
- MTC machine type communication
- O&M operations and maintenance
- PDCCH physical downlink control channel
- PDSCH physical downlink shared channel
- PDU protocol data unit
- PRB physical resource block
- PTM point-to-multipoint
- PUCCH physical uplink control channel
- PUSCH physical uplink shared channel
- RAN radio access network
- RNTI radio network temporary identifier
- RLC-UM radio link control unacknowledged mode
- RRC radio resource control
- Rx reception, receiver
- SGW serving gateway
- SIB system information block
- SR scheduling request
- TDM time division multiplexing
- TSG telecommunication security group
- TSG-SA TGS service and system aspects
- Tx transmission, transmitter
- TTI transmission time interval
- UE user equipment
- UP uplink
- UTRAN universal terrestrial radio access network
- WG working group Device-to-device (D2D) communication may enable new service opportunities and reduce the eNB load for short range data intensive peer-to-peer communications. Qualcomm has proposed a study item for the D2D in 3GPP TSG-RAN #52 plenary, 31 May-3 Jun. 2011, e.g., see Tdoc-RP-110706, "On the need for a 3GPP study on LTE device-to-device discovery and communication", Qualcomm Incorporated, 3GPP TSG-RAN #52, Bratislava Slovakia May 31-Jun. 3 2011; Tdoc-RP-110707, "Study on LTE Device to Device Discovery and Communication—Radio Aspects, "Qualcomm Incorporated, 3GPP TSG-RAN #52, Bratislava Slovakia May 31-Jun. 3 2011; Tdoc-RP-110708, "Study on LTE Device to Device Discovery and Communication—Service and System Aspects," Qualcomm Incorporated, 3GPP TSG-RAN #52, Bratislava Slovakia May 31-Jun. 3 2011.

One of the main targets is to evolve the LTE platform in order to intercept the demand of proximity-based applications by studying enhancements to the LTE radio layers that allow devices to discover each other directly over the air. Then the devices may communicate directly if it makes sense from a system management point of view upon appropriate network supervision.

The document Tdoc-RP-110706 quoted above states as follows: "This radio-based discovery process needs also to be coupled with a system architecture and a security architecture that allow the 3GPP operators to retain control of the device behavior, for example who can emit discovery signals, when and where, what information do they carry, and what devices should do once they discover each other."

Currently use cases and service requirements are discussed for the D2D communications under TGS-SA WG1. The following use cases have been proposed:

a) social applications, such as exchange of files, photos, text messages, etc., VoIP conversations, one-way streaming video and two-way video conference;

b) local advertising;

c) multiplayer gaming: for example, high resolution media (voice & video) can be exchanged interactively either with all participants or team members within a game environment, and the control inputs are expected to be received by all game participants with an ability to maintain causality;

d) network offloading: when an opportunistic proximity offload potential exists, Device 1 initiates a transfer of the media flow from the macro network to a proximity communications session with Device 2, conserving macro network resources while maintaining the quality of user experience for the media session;

e) smart meters: communication among low capability MTC devices, vehicular communication (safety and non-safety), and general M2M communication among different capability devices/machines in long term;

f) public safety: for example, TETRA like functionality. Furthermore, two types of D2D communication are of interest. One is the network controlled D2D communications taking place under coverage of the controlling network and the other is ad hoc D2D communications taking place without any cellular system coverage supporting the D2D communications. Moreover, radio resource allocation for the D2D discovery to allow devices belonging to multiple cells to discover each other in the network controlled D2D operation may be another challenge.

SUMMARY

According to a first aspect of the invention, a method comprising: at least one processor and a memory storing a set of computer instructions, in which the memory storing the computer instructions is configured with at least one processor to cause the apparatus to: determine an allocation of one or more resources for a device-to-device discovery among a plurality of user equipments located in multiple cells of the network in a device-to-device discovery area; and provide the allocation of the one or more resources to the plurality of user equipments for performing, using the one or more resources, the device-to-device discovery between any two user equipments of the plurality of user equipments located in the multiple cells.

According to a second aspect of the invention, an apparatus comprising: at least one processor and a memory storing a set of computer instructions, in which the memory storing the computer instructions is configured with at least one processor to cause the apparatus to: determine an allocation of one or more resources for a device-to-device discovery among a plurality of user equipments located in multiple cells of the network in a device-to-device discovery area; and provide the allocation of the one or more resources to the plurality of user equipments for performing, using the one or more resources, the device-to-device discovery between any two user equipments of the plurality of user equipments located in the multiple cells.

According to a third aspect of the invention, a computer readable memory with computer readable instructions recorded thereon comprising: code for determining, by a network, allocation of one or more resources for device-to-device discovery among a plurality of user equipments located in multiple cells of the network in a device-to-device discovery area; and code for providing the allocation of the one or more resources to the plurality of user equipments for performing, using the one or more resources, the device-to-device discovery between any two user equipments of the plurality of user equipments located in the multiple cells.

According to a fourth aspect of the invention, a method, comprising: receiving, by an eNB from a network, allocation of one or more resources for device-to-device discovery among a plurality of user equipments located in multiple cells of the network in a device-to-device discovery area, the eNB comprises one of the multiple cells; and configuring, by the eNB in synchronization with other eNBs of the multiple cells and based on the allocation of the one or more resources, the plurality of user equipments for performing, using the one or more resources, the device-to-device discovery between any two user equipments of the plurality of user equipments located in the multiple cells.

According to a fifth aspect of the invention, an apparatus comprising: at least one processor and a memory storing a set of computer instructions, in which the memory storing the computer instructions is configured with at least one processor to cause the apparatus to: receive from a network allocation of one or more resources for device-to-device discovery among a plurality of user equipments located in multiple cells of the network in a device-to-device discovery area, the apparatus comprises an eNB of one of the multiple cells; and configure, in synchronization with other eNBs of the multiple cells and based on the allocation of the one or more resources, the plurality of user equipments for performing, using the one or more resources, the device-to-device discovery between any two user equipments of the plurality of user equipments located in the multiple cells.

BRIEF DESCRIPTION OF THE DRAWINGS:

For a better understanding of the nature and objects of the present invention, reference is made to the following detailed description taken in conjunction with the following drawings, in which:

FIG. 1 is a prior art schematic diagram of E-UTRAN architecture in which exemplary embodiments detailed herein may be practiced to advantage;

FIG. 2 is a prior art schematic diagram of MBMS service area comprising MBSFN areas, in which exemplary embodiments detailed herein may be practiced to advantage;

FIG. 3 is a prior art schematic diagram of E-MBMS logical architecture, by using which exemplary embodiments detailed herein may be practiced to advantage;

DETAILED DESCRIPTION

Figure 4:
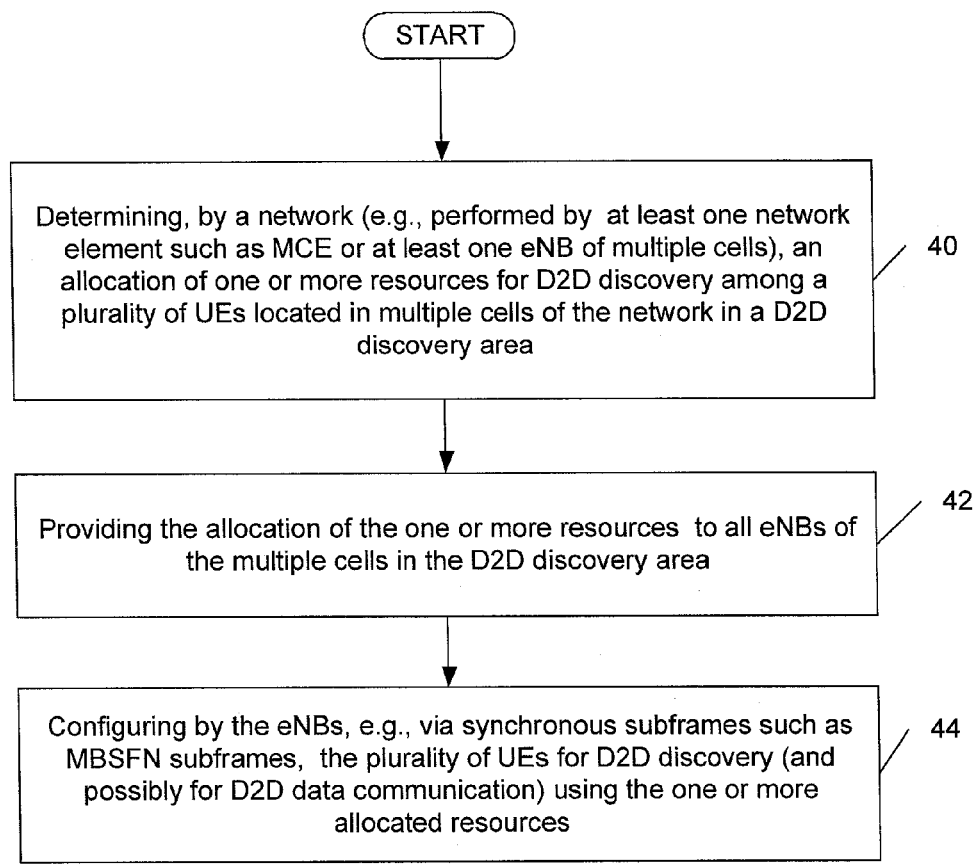
FIG. 4 is a flow chart demonstrating implementation of exemplary embodiments of the invention performed by a network.

A new method, apparatus, and software related product (e.g., a computer readable memory) are presented for implementing a D2D discovery resource allocation by a network for D2D discovery by UEs belonging to multiple cells in a D2D discovery area, e.g., in LTE wireless systems. Each of the UEs may be implemented as a mobile phone, a wireless communication device, a camera phone, a portable wireless device and the like.

First, examples of current system architectures and their performance are provided below, which may be used for implementing various embodiments of the invention. It is noted that in LTE wireless systems, FDM, TDM and CDM are all available which may increase the discovery signal multiplexing capacity.

E-UTRAN network (access network for LTE) architecture is shown in FIG. 1, in which exemplary embodiments, detailed herein, may be practiced to advantage. The eNBs 20, 22 and 24 are inter-connected with each other by means of an interface X2, and to the EPC by means of the S1 interface, i.e., to the MME by means of the S1-MME interface and to the SGW by means of the S1-U interface.

E-UTRAN also specifies a MBMS as described in 3GGP TS 36.300 10.4.0 (2011-06), Section 15, which is selectively summarized below.

FIG. 2 shows a schematic diagram of a MBMS service area 26 comprising MBSFN areas 28a, 28b and 28c, in which exemplary embodiments detailed herein may be practiced to advantage. A MBSFN area may consist of a group of cells within a MBSFN synchronization area of a network, which are co-ordinated to achieve a MBSFN transmission. Except for the MBSFN area reserved cells, all cells within an MBSFN area contribute to the MBSFN transmission and advertise its availability. The UE may only need to consider a subset of the MBSFN areas that are configured, i.e., when it knows which MBSFN area applies for the service(s) it is interested to receive. In exemplary embodiments of the invention, there is a D2D discovery area similar to the MBSFN area.

FIG. 3 shows a schematic diagram of an E-MBMS logical architecture which exemplary embodiments detailed herein may be utilized for D2D purposes. The RAN, whether E-UTRAN, UTRAN or GERAN, is responsible for delivering MBMS data to the designated MBMS service area. A MCE 30 is a logical entity which deals (among other functions) with session control and manages the subframe allocation and radio resource configuration to ensure that all eNBs participating in an MBMS transmission within a semi-statically configured area (e.g., MBSFN area in FIG. 2) use exactly the same configuration. The MCE is involved in MBMS session control signaling, but does not perform direct signaling to UEs.

The MBMS GW 32 is a logical entity that is present between the BMSC and eNBs whose principal functions is sending of MBMS packets to each eNB 20, 22 or 24 transmitting the service. The MBMS GW uses IP Multicast as the means of forwarding MBMS user data to the eNB. The MBMS GW 32 performs MBMS session control signaling (Session start/stop) towards the E-UTRAN via the MME. Also shown in FIG. 3 is a user plane interface Ml, an E-UTRAN internal control plane interface M2, and a control plane interface M3 between the E-UTRAN and the EPC.

Multi-cell transmission of the MBMS has the following characters (but not limited to) known in the art:
  synchronous transmission of MBMS within the MBSFN area;
  combining MBMS transmissions from multiple cells is supported;
  scheduling of each MCH is done by the MCE;
  MTCH and MCCH can be multiplexed on the same MCH and are mapped on the MCH for PTM transmission;
  MTCH and MCCH use the RLC-UM mode;
  the MAC subheader indicates the LCID for MTCH and MCCH; and
  the MBSFN Synchronization Area, the MBSFN Area, and the MBSFN cells are semi-statically configured, e.g., by O&M, and MBSFN areas are static unless changed by the O&M (i.e., no dynamic change of areas).

MCH scheduling information (MSI) is provided per MCH to indicate which subframes are used by each MTCH during the MSP (MCH scheduling period). The following principles known in the art may be used for the MSI:
  it is used both when services are multiplexed onto the MCH and when only a single service is transmitted on the MCH;
  it is generated by the eNB and provided once at the beginning of the MSP;
  it has higher scheduling priority than the MCCH and, when needed, it appears first in the PDU;
  it allows the receiver to determine what subframes are used by every MTCH, sessions are scheduled in the order in which they are included in the MCCH session list;
  it is carried in a MAC control element which cannot be segmented; and
  it carries the mapping of MTCHs to the subframes of the associated MSP; this mapping is based on the indexing of subframes belonging to one MSP.

The following principles known in the art may govern the MCCH structure:
  one MBSFN area is associated with one MCCH and one MCCH corresponds to one MBSFN Area;
  the MCCH is sent on the MCH;
  the MCCH consists of a single MBSFN area configuration RRC message which lists all the MBMS services with ongoing sessions and an optional MBMS counting request message;
  the MCCH is transmitted by all cells within an MBSFN area, except the MBSFN area reserved cells;
  the MCCH is transmitted by RRC every MCCH repetition period;
  the MCCH uses a modification period;
  a notification mechanism is used to announce changes of MCCH due to either session start or the presence of an MBMS counting request message;
  the notification is sent periodically throughout the modification period preceding the change of MCCH in MBSFN subframes configured for notification;
  the DCI format 1C with M-RNTI is used for notification and includes an 8-bit bitmap to indicate the one or more MBSFN Area(s) in which the MCCH change(s);
  the UE monitors more than one notification subframes per modification period;
  when the UE receives a notification, it acquires the MCCH at the next modification period boundary; and
  the UE detects changes to the MCCH which are not announced by the notification mechanism by MCCH monitoring at the modification period.

The BCCH only points to the resources where the MCCH (s) can be found, i.e., it does not indicate the availability of the services, and the following principles known in the art may be applied:
  for each MCCH, the BCCH indicates independently:
    scheduling of the MCCH for multi-cell transmission on MCH,
    a MCCH modification period, a repetition period radio frame an offset and subframe allocation,
    an MCS which applies to the subframes indicated for MCCH scheduling and for the first subframe of all MSPs in that MBSFN Area;
  for the notification commonly used for all MCCH, BCCH:
    configures the position of the MCCH change notification subframe and the number of occasions monitored by the UE, and
    indicates the mapping between the PDCCH bit(s) carried in the notification and the MCCH(s).

The MBMS BCCH information is embedded in SIB 2 (which includes common and shared channel information) and SIB 13 (which includes MBMS related control information). Each UE in the network will read SIB 2. Then UE can find mbsth-SubframeConfigList that consists of MBSFN-SubframeConfig elements that tell the sub-frames where MBMS information can be found (see 3GGP TS 36.331, V10.3.0 (2011-09), sections 5.2.2.9 and 6.3.1 regarding SystemInformationBlockType2 information element).

According to an embodiment of the invention, a network such as LTE may determine an allocation of one or more resources for device-to-device discovery among a plurality of UEs located in multiple cells of the network in a D2D discovery area, the multiple cells may correspond to the eNBs 20-24 shown in FIG. 1. The one or more resources may be resources which are conventionally allocated for a DL use (e.g., for MCCH, MTCH and/or MBSFN subframes) or for a UL use (e.g., for PUCCH or PUSCH). The allocation of the one or more resources is then provided by the network to the plurality of UEs for performing D2D discovery between any two UEs of the plurality of UEs located in the multiple cells in the D2D discovery area.

For example, determining the allocation of the one or more resources may be performed by at least one network element such as the MCE shown in FIG. 3. Also determining may be implemented by at least one eNB of the multiple cells (this one eNB is in communication with other eNBs in the D2D discovery area), or by other network element/elements for a corresponding application. Providing the allocation of the one or more resources to the plurality of UEs may comprise providing it to the eNBs of the multiple cells in the D2D discovery area for configuring the plurality of user equipments for the D2D discovery using these one or more resources. This configuring by the eNBs of the plurality of UEs for the D2D discovery using the one or more resources may be performed via subframes (synchronous or not) transmitted by the eNBs to the UEs in the D2D discovery area.

Moreover, in one embodiment the DL MBSFN subframes may be used/determined as D2D discovery resources. D2D discovery could be seen as one service of MBSFN. The MBSFN subframes used for the D2D discovery may be common for all cells belonging to a corresponding MBSFN area, e.g., shown in FIG. 2. Then the MBSFN area is the D2D discovery area as described herein.

In case the MBSFN area doesn't support/have active services other than the D2D discovery service, a number of different variations may be used. For instance, a MBSFN subframe indication may be included in SIB13 to instruct legacy MBMS UE devices (non-D2D capable UE devices) not to attempt to decode the corresponding MCCH transmitted on the MBSFN subframes. This indication may be provided by setting mcch-RepetitionPeriod-r9 (transmitted in mcch-Config-r9 in MBSFN-AreaInfoList IE, see 3GGP TS 36.331, V10.3.0 (2011-09) Section 6.3.7) parameter value to infinity. Also in one non-limiting alternative for this embodiment in those MBSFN subframes where a MCCH is transmitted, the eNB indicates in that MCCH that the service is D2D discovery.

In case the MBSFN area supports/has active services other than the said D2D discovery service, the MCCH may be restricted to be transmitted in the MBSFN subframes not carrying D2D discovery information. It is further noted that the symbol, CP, slot and TTI lengths may be different for the D2D discovery service (implemented by the UEs) than for the other MBSFN services (transmitted by the eNBs).

According to this embodiment the MBSFN subframe resources may be at least partly used for both D2D discovery and D2D data transmissions by the UEs.

Moreover, in a further embodiment the D2D discovery resource allocation in the LTE system may utilize an analogy to the MBMS. The neighboring cells may form D2D discovery areas wherein the discovery subframes providing information on the D2D discovery resources are common for all the cells belonging to a certain D2D discovery area.

It is noted that in this embodiment the D2D discovery areas may be similar to MBSFN areas for the D2D discovery, but for the case of D2D the UEs and network are not required to support MBMS as such. Furthermore, one cell may belong to multiple D2D discovery areas.

According to this further embodiment, the network may reserve the whole bandwidth (or a partial bandwidth) of some UL subframes as a resource/resources for the D2D discovery. For example, the allocation may correspond to the whole PUSCH bandwidth or a part of it. The D2D discovery allocation period and corresponding subframe allocations may be broadcasted in system information that is common for all UE devices, e.g., in SIB2 (or in general in SIBx). The symbol, CP, slot and TTI lengths may be different for the D2D discovery transmissions than for other uplink transmissions.

According to this further embodiment the allocated UL D2D discovery resources may be transmitted in a subframe that corresponds to the DL MBSFN subframe in DL. For example, if the DL MBSFN transmission is HARQ-less, the UL subframe wherein feedback would be transmitted which maps from that DL subframe may be used for D2D discovery since it will not carry MBMS HARQ responses. For example, in the current LTE the relation between DL and corresponding UL feedback is n+4 subframes where n is the DL subframe.

According to this embodiment, the periodic CSI, SR or any other PUCCH information may be dropped if it collides with the D2D discovery subframe. For example, the network may handle the PUCCH information/reports not to overlap with the D2D discovery subframe. The network can also handle the legacy UE configurations not to overlap with the D2D discovery subframe, so that in the future systems the UEs may be able to drop/defer periodic reports whenever they overlap with the D2D discovery subframe.

In another option of this further embodiment, it is up to eNB implementation if the UL retransmissions are permitted to overlap with D2D discovery channel. According to this further embodiment the D2D discovery subframe resources may be at least partly used for the D2D data transmission between the UEs in the D2D discovery area.

FIG. 4 shows an exemplary flow chart from the perspective of the network for determining resources and configuring the UE devices in the D2D area comprising multiple cells for D2D discovery. It is noted that in FIG. 4 different steps may be added or substituted, or selected steps or groups of steps may be performed in a separate application. FIGS. 1-3 provide exemplary architectures for implementing steps shown in FIG. 4.

In a method according to the exemplary embodiment shown in FIG. 4, in a first step 40, it is determined by a network (e.g., performed by at least one network element such as MCE or at least one eNB of multiple cells), an allocation of one or more resources in DL and/or UL for a D2D discovery among a plurality of UEs located in multiple cells of the network in a D2D discovery area (e.g., in a MBSFN area), as disclosed herein.

In a next step 42, allocation of the one or more resources is provided by the network element determining this allocation to all eNBs of the multiple cells in the D2D discovery area. In a next step 44, all these eNB configure (e.g., via synchronous subframes such as MBSFN subframes) the plurality of UEs for the D2D discovery (and possibly for D2D data communication) using the one or more allocated resources as described herein. It is noted that the configuring may be separate for each UEs. Furthermore, the configuration of D2D resources are not required to be in the subframes (such as MBSFN subframes) used for the D2D discovery.

Figure 5:
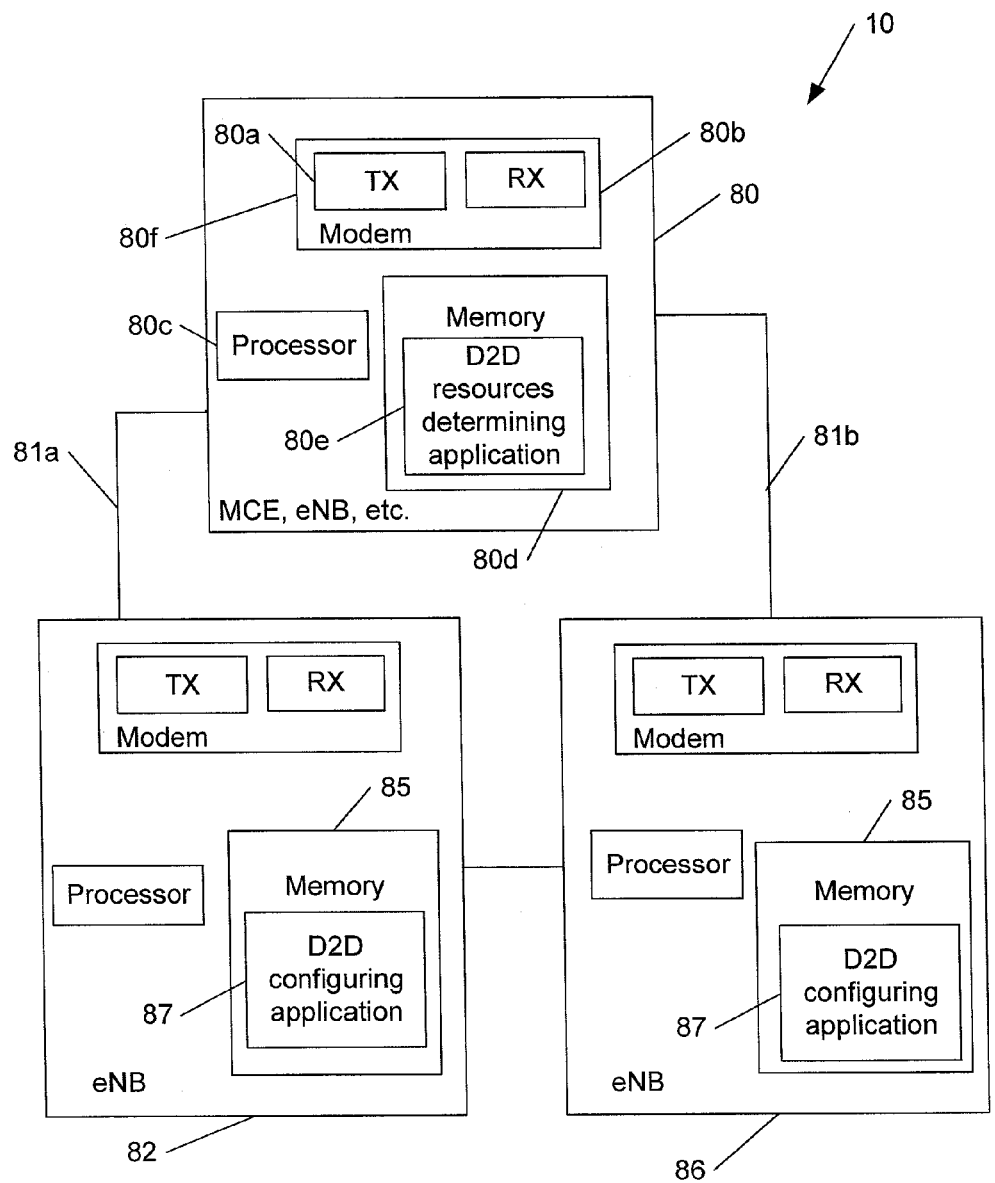
FIG. 5 is a block diagram of wireless devices for practicing exemplary embodiments of the invention.

FIG. 5 shows an example of a block diagram demonstrating LTE network elements 80, 82 and 86 comprised in a network 10, according to an embodiment of the invention. FIG. 5 is a simplified block diagram of various electronic apparatus that are suitable for practicing the exemplary embodiments of this invention, e.g., in reference to FIGS. 1-4, and a specific manner in which components of an electronic apparatus are configured to cause that electronic device to operate. The network element 80 may be an MCE, MME, eNB or the like and comprise, e.g., at least one transmitter 80a, at least one receiver 80b, at least one processor 80c at least one memory 80d storing a computer program such as a deployment bandwidth configuring application 80e. The transmitter 80a and the receiver 80b and corresponding antennas (not shown in FIG. 5) may be configured to provide wired or wireless communications with the eNBs 82 and 86 (and others not shown in FIG. 5) in the D2D discovery.

The transmitter 80*a* and the receiver 80*b* may be generally means for transmitting/receiving and may be implemented as a transceiver, or a structural equivalence thereof. It is further noted that the same requirements and considerations are applied to transmitters and receivers of the eNBs 82 and 86.

Furthermore, the network element 80 may further comprise communicating means such as a modem 80*f*, e.g., built on an RF front end chip of the network device 80, which also carries the TX 80*a* and RX 80*b* for bidirectional wired or wireless communications via data/control/broadcasting links 81*a* and 81*b* with the eNBs 82 and 86. The same concept is applicable to UE devices 82 and 86 shown in FIG. 5.

Various embodiments of the at least one memory 80*d* (e.g., computer readable memory) may include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the processor 80*c* include but are not limited to general purpose computers, special purpose computers, microprocessors, digital signal processors (DSPs) and multi-core processors Similar embodiments are applicable to memories and processors in other devices 82 and 86 shown in FIG. 5.

The D2D resources determining application module 80*e* may provide various instructions for performing steps 40-42 in FIG. 4. The module 80*e* may be implemented as an application computer program stored in the memory 80*d*, but in general it may be implemented as software, firmware and/or a hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions)/computer program code (i.e., the software or firmware) thereon to be executed by a computer processor.

Furthermore, the module 80*e* may be implemented as a separate block or may be combined with any other module/block of the device 80, or it may be split into several blocks according to their functionality.

The eNBs 82 and 86 may have similar components as the network device 80, as shown in FIG. 5, so that the above discussion about components of the device 80 is fully applicable to the components of the eNBs 82 and 86.

D2D configuring application modules 87 in the eNBs 82 and 86 may provide various instructions at least for performing step 44 in FIG. 5. The module 87 may be implemented as an application computer program stored in the memory 85, but in general it may be implemented as software, firmware and/or a hardware module or a combination thereof. In particular, in the case of software or firmware, one embodiment may be implemented using a software related product such as a computer readable memory (e.g., non-transitory computer readable memory), computer readable medium or a computer readable storage structure comprising computer readable instructions (e.g., program instructions) using a computer program code (i.e., the software or firmware) thereon to be executed by a computer processor.

Furthermore, the module 87 may be implemented as a separate block or may be combined with any other module/block of the eNB 82 or 86, or it may be split into several blocks according to their functionality.

It is noted that various non-limiting embodiments described herein may be used separately, combined or selectively combined for specific applications.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

It is to be understood that the above-described arrangements are only illustrative of the application of the principles of the present invention. Numerous modifications and alternative arrangements may be devised by those skilled in the art without departing from the scope of the invention, and the appended claims are intended to cover such modifications and arrangements.

What is claimed is:

1. A method, comprising:
   allocating, by a network, at least a portion of one or more uplink resources for device-to-device discovery among a plurality of at least three user equipments located in multiple cells of the network in a device-to-device discovery area; and
   broadcasting, by eNBs of the multiple cells, an indication of the allocated at least portion of the one or more uplink resources to the plurality of user equipments on synchronous Multimedia Broadcast Multicast Service Single Frequency Network (MBSFN) subframes transmitted in the time synchronization by the eNBs of the multiple cells.

2. The method of claim 1, wherein a determination of the at least portion of the one or more uplink resources is made by at least one network element and the determined at least portion of the one or more uplink resources for the allocation is provided to the eNBs of the multiple cells in the device-to-device discovery area for broadcasting the indication.

3. The method of claim 1, further wherein a multicell/multicast coordination entity determines the at least portion of the one or more uplink resources for the allocation to the plurality of user equipments and provides to the eNBs of the multiple cells the determined at least portion of the one or more uplink resources for broadcasting.

4. The method of claim 1, wherein a first eNB of the eNBs of the multiple cells determines the allocation of the at least portion of the one or more uplink resources and the first eNB provides to all other eNBs of the multiple cells the allocation of the at least portion of the one or more uplink resources for the broadcasting the indication.

5. The method of claim 1, wherein the device-to-device discovery area is a Multimedia Broadcast Multicast Service Single Frequency Network area.

6. The method of claim 1, wherein the allocated at least portion of the one or more uplink resources comprise at least a part of a bandwidth of a physical uplink shared channel.

7. The method of claim 1, wherein the allocated at least portion of the one or more uplink resources comprise at least one resource for a downlink MBSFN subframe.

8. The method of claim 1, wherein the allocated at least portion of the one or more uplink resources comprise at least one sub frame on an uplink channel which maps from a downlink MBSFN subframe.

9. The method of claim 8, wherein the network is configured to drop or defer any other information on the uplink channel to avoid a collision with the at least one subframe.

10. A system comprising:
    circuitry configured to:

allocate at least a portion of one or more uplink resources for a device-to-device discovery among a plurality of at least three user equipments located in multiple cells of the network in a device-to-device discovery area; and control broadcasting, by eNBs of the multiple cells, an indication of the allocated at least portion of the one or more uplink resources to the plurality of user equipments on synchronous Multimedia Broadcast Multicast Service Single Frequency Network (MBSFN) subframes transmitted in the time synchronization by the eNBs of the multiple cells.

11. The system of claim 10, wherein determination of the at least portion of the one or more uplink resources is made by at least one network element and the determined at least portion of the one or more uplink resources for the allocation is provided to the eNBs of the multiple cells in the device-to-device discovery area for broadcasting the indication.

12. The system of claim 10, wherein a multicell/multicast coordination entity determines the at least portion of the one or more uplink resources for the allocation to the plurality of user equipments and provides to the eNBs of the multiple cells the determined at least portion of the one or more uplink resources for broadcasting the indication.

13. The system of claim 10, wherein a first eNB of the eNBs of the multiple cells determines the allocation of the at least portion of the one or more uplink resources and the first eNB provides to all other eNBs of the multiple cells the allocation of the at least portion of the one or more uplink resources for broadcasting the indication.

14. The system of claim 10, wherein the device-to-device discovery area is a Multimedia Broadcast Multicast Service Single Frequency Network area.

15. The system of claim 10, wherein the allocated at least portion of the one or more uplink resources comprise at least a part of a bandwidth of a physical uplink shared channel.

16. The system of claim 10, wherein the allocated at least portion of the one or more uplink resources comprise at least one resource for a downlink MBSFN subframe.

17. The system of claim 10, wherein the allocated at least portion of the one or more uplink resources comprise at least one sub frame on an uplink channel which maps from a downlink MBSFN subframe.

18. The system of claim 17, wherein the uplink channel which maps from a downlink MBSFN subframe is a subframe configured to transmit multimedia broadcast service hybrid automatic repeat request (HARM) responses.

19. A method, comprising:
receiving, by an eNB from a network, allocation of one or more uplink resources for device-to-device discovery among a plurality of at least three user equipments located in multiple cells of the network in a device-to-device discovery area, wherein the eNB comprises one of the multiple cells; and broadcasting, by the eNB in time synchronization with other eNBs of the multiple cells, an indication of the allocation of the one or more uplink resources to the plurality of user equipments on synchronous Multimedia Broadcast Multicast Service Single Frequency Network (MBSFN) subframes transmitted in the time synchronization by the eNBs of the multiple cells.

20. An apparatus comprising:
circuitry configured to:
receive from a network allocation of one or more uplink resources for device-to device discovery among a plurality of at least three user equipments located in multiple cells of the network in a device-to-device discovery area, wherein the apparatus comprises an eNB of one of the multiple cells; and broadcasting, in time synchronization with other eNBs of the multiple cells, an indication of the allocation of the one or more uplink resources to the plurality of user equipments on synchronous Multimedia Broadcast Multicast Service Single Frequency Network (MBSFN) subframes transmitted in the time synchronization by the eNBs of the multiple cells.

* * * * *